United States Patent [19]

Rosecrans

[11] 4,366,746
[45] Jan. 4, 1983

[54] PRESSURIZED HYDRAULIC FLUID SYSTEM USING CROSS-LINKED CHLORINATED POLYETHYLENE HOSE

[75] Inventor: Alfred E. Rosecrans, Jackson, Mich.

[73] Assignee: Aeroquip Corporation, Jackson, Mich.

[21] Appl. No.: 817,798

[22] Filed: Jul. 21, 1977

Related U.S. Application Data

[63] Continuation of Ser. No. 442,379, Feb. 14, 1974, abandoned.

[51] Int. Cl.$^3$ ........................ F15B 11/08; F16L 11/10
[52] U.S. Cl. ...................................... 91/467; 138/125
[58] Field of Search ............... 138/126, 125, 127, 137, 138/123; 260/858, 884, 899, 859 R, 859 PV; 417/321; 91/467

[56] References Cited

U.S. PATENT DOCUMENTS

| | | | |
|---|---|---|---|
| 3,260,694 | 7/1966 | Wang | 260/41 |
| 3,407,171 | 10/1968 | Segre | 260/41 |
| 3,528,260 | 9/1970 | Binder | 62/498 |
| 3,565,974 | 2/1971 | Ohnuma et al. | 260/878 |
| 3,594,449 | 7/1971 | Binder | 260/859 |
| 3,882,191 | 5/1975 | Balatoni et al. | 260/859 R X |
| 3,929,928 | 12/1975 | Wolf et al. | 260/859 R |
| 3,991,243 | 11/1976 | Biddell | 138/156 X |
| 4,035,440 | 7/1977 | Khanna et al. | 260/859 R |

FOREIGN PATENT DOCUMENTS 659455  5/1965  Belgium ............................... 138/127

*Primary Examiner*—James E. Bryant, III
*Attorney, Agent, or Firm*—Beaman & Beaman

[57] ABSTRACT

A hydraulic fluid system including fluid pressurizing means, such as a pump, and pressurized fluid utilizing means, such as a hydraulic motor, interconnected by flexible hose lines formed of material having cross-linked chlorinated polyethylene containing 25%–50% chlorine by weight as a prime constituent. The cross-linked chlorinated polyethylene material comprises, by weight, 30%–70% of the hose rubber material, and a hose constructed in accord with the invention has unusual resistance to high temperatures, flexing, high pressure and chemical corrosion.

1 Claim, 4 Drawing Figures

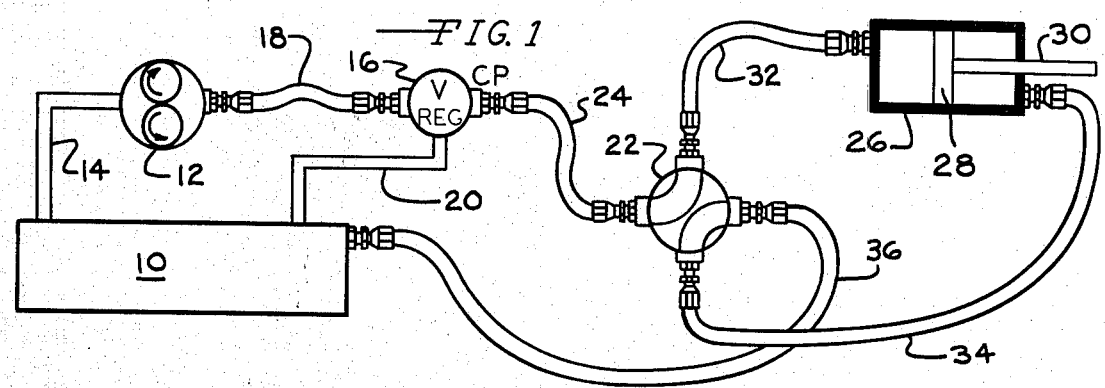
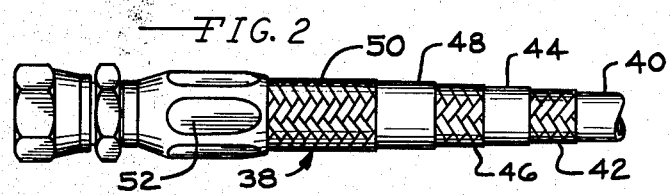
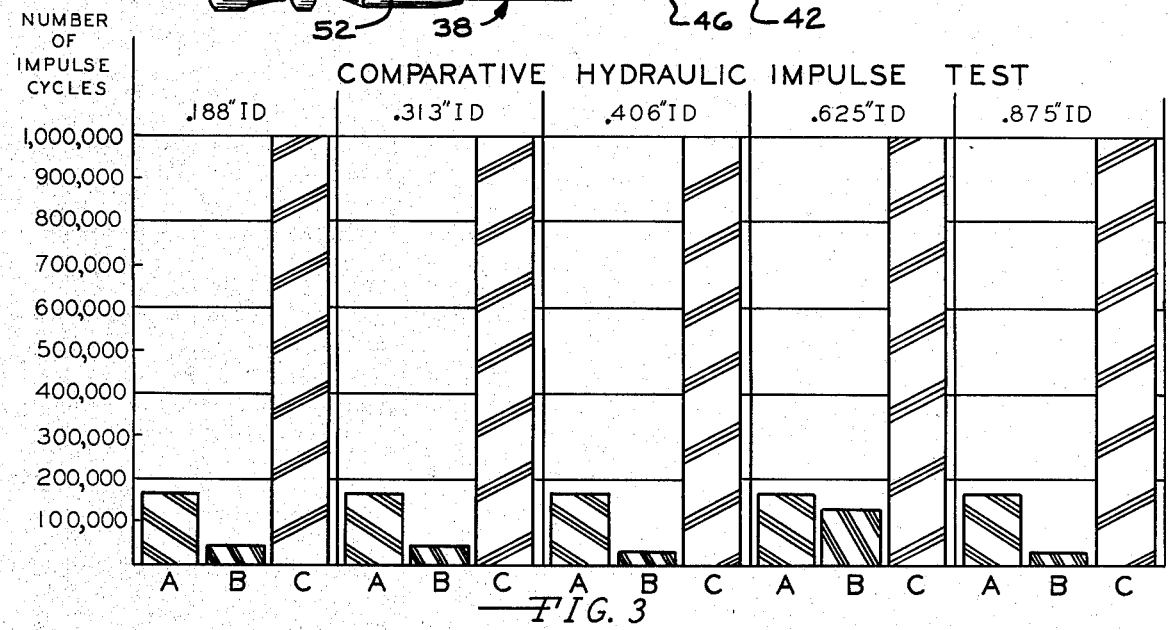
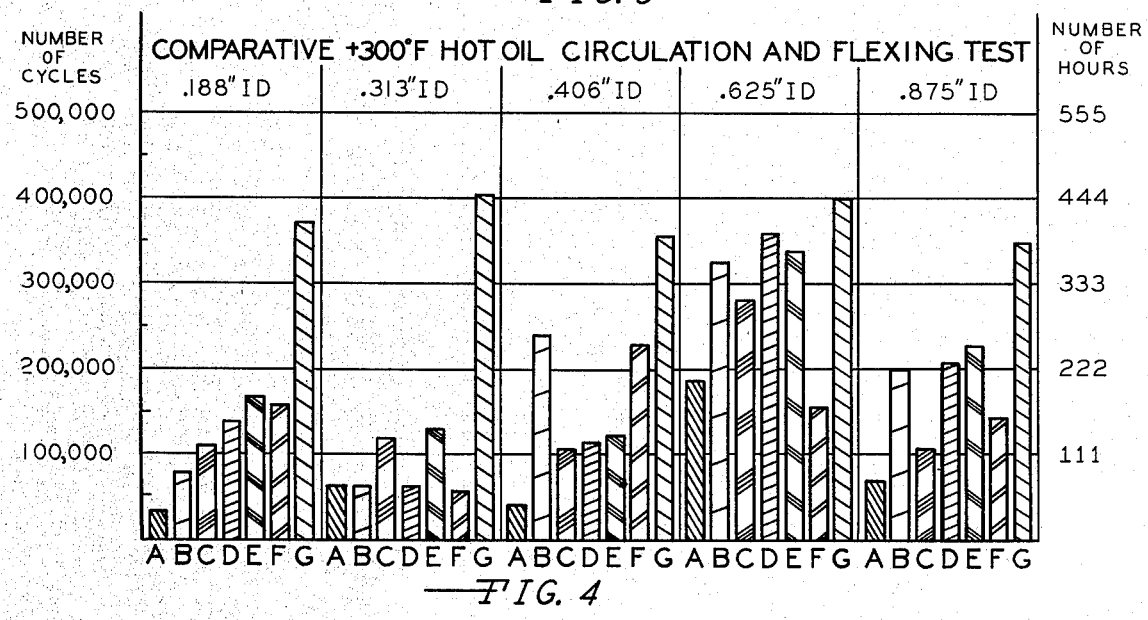

ID
PRESSURIZED HYDRAULIC FLUID SYSTEM USING CROSS-LINKED CHLORINATED POLYETHYLENE HOSE

This is a continuation of application Ser. No. 442,379 filed Feb. 14, 1974 now abandoned.

BACKGROUND OF THE INVENTION

The invention pertains to the field of hydraulic systems utilizing flexible hose conduits interconnecting the components of the system.

Pressurized fluid systems commonly employ a fluid reservoir, a pressure producing member, such as a pump, pressurized fluid utilizing means, such as a rotary hydraulic motor, an expansible chamber motor or a bearing, and valve components are usually used for controlling the flow of medium between a pump and motor. Hydraulic pressurized systems are employed in a wide variety of environments wherein pressurized fluid is used to lift, lower, push, pull and position components relative to each other. Also, similar systems are used for lubrication purposes, such as in internal combustion engines and heavy duty equipment utilizing pressurized bearings.

In the pumping of the fluid, the valving and the fluid flow, considerable heat is generated within the fluid due to shear forces, and as the pressurized medium utilizing means, such as the motor, may be mounted upon a component movable with respect to the valve or pump, flexible hose lines are often commonly employed between the various components of the system. The combination of high internal hose pressure, heat and flexing cause the hose to deteriorate and periodic replacement is required.

Another detrimental effect upon flexible hose as used in pressurized hydraulic systems lies in the "aging" that occurs as the hose is stored, or while in use. Such aging results from oxidation and the effects of Ozone and the other agents present in the air, particularly at industrial locations.

Also, the hose employed in pressurized hydraulic systems is subjected to possible chemical reaction with the fluid itself and it is necessary that the hose material be chemically compatible with the hydraulic fluid being employed. For instance, certain fire resistant synthetic hydraulic fluids require a different type of hose material than more conventional petroleum based hydraulic fluids.

In the past, it has been necessary for pressurized hose distributors to maintain a large inventory of hose to meet the requirements of usage, and as hydraulic hose is manufactured in a wide range of sizes and to meet a wide variety of pressure specifications, the hose inventory requirements of a hose distributor become very large and costly.

In an effort to meet the aforementioned problems with respect to improving the life and operating characteristics of pressurized flexible hose, a number of hose elastomers and rubbers have been used, such as Buna-N rubber, ethylene propolyene rubber, butyl rubber and polychloroprene rubber. However, while certain of such elastomers and rubbers are usable with petroleum based fluids and others are usable only with non-petroleum based fluids, these elastomers age on the shelf and in use, are not usable with a wide range of fluids of various chemical composition, and rapidly deteriorate at elevated temperatures, such as 300° F., and are usable only at relatively low temperatures. Under hydraulic impulse tests wherein hydraulic pressures are imposed upon a test hose periodically under controlled temperature conditions, hoses from such materials, though reinforced, usually fail at less than 200,000 pressure impulse cycles, and under flexing-pressurization tests at 300° F. such hoses usually fail at less than 300,000 cycles and 300 hours of testing. It will therefore be appreciated that under relatively high temperature conditions such pressurized flexible hose having working pressures between 500 and 3,000 psi must be replaced relatively often.

It has been recognized in U.S. Pat. No. 3,528,260 that a flexible hose using cross-linked chlorinated polyethylene as a major constituent is of advantage as used in refrigeration systems employing Freon type refrigerant fluids. However, the hose disclosed in this patent is not suitable for use with most hydraulic pressurized fluid applications as it would not withstand the elevated temperatures of such usage, and would also fail due to the higher pressures encountered as compared with a refrigeration circuit.

SUMMARY OF THE INVENTION

It is an object of the invention to provide a pressurized flexible hose particularly suitable for hydraulic fluid systems wherein elevated temperatures and high pressures are employed, the hose being capable of dependable operation for extended periods.

A further object of the invention is to provide a flexible hose for hydraulic fluid systems under pressure wherein the hose is chemically compatible with a wide range of fluids, and the hose of the invention may be used to replace the several types of flexible hose now available specially designed for petroleum or non-petroleum based hydraulic fluids.

An additional object of the invention is to provide a flexible hose for pressurized hydraulic fluid systems which is of superior strength, flexibility, and other physical characteristics as compared with hose presently available for similar purposes, may be readily manufactured with conventional hose manufacturing techniques, and may be used with available end fittings without modification to the fittings.

In the practice of the invention hydraulic fluid components, such as pumps, valves, motors, reservoirs and the like are interconnected by flexible hose lines having cross-linked chlorinated polyethylene as a prime constituent. In the practice of the invention the cross-linked chlorinated polyethylene has a chlorine content, by weight, between 25% and 50%, and the rubber material of the hose comprises 30% to 70% cross-linked chlorinated polyethylene, by weight, of the hose material. By utilizing a cross-linked chlorinated polyethylene having the aforementioned chlorine content, and forming hose having the aforementioned percentage of cross-linked chlorinated polyethylene, a hose for use with pressurized hydraulic fluid systems is produced which is of such physical characteristics as to overcome the deficiencies of known pressurized hydraulic fluid hose lines as mentioned above. Hose lines constructed in accord with the invention have an effective life considerably greater than conventional hose lines, and impulse tests and high temperature circulating and flexing tests indicate that hose in accord with the invention are capable of performing considerably longer than hose constructed of more conventional materials.

In particular, hose employing the aforementioned proportions and quantity of cross-linked chlorinated polyethylene is capable of functioning at 300° F. for extended periods of time without noticeable deterioration, and such hose is not adversely affected chemically by either petroleum or non-petroleum based hydraulic fluids. Thus, hydraulic pressurized hose lines constructed in accord with the invention may be used with a much wider range of hydraulic fluids than heretofore known hose, significantly reducing the inventory requirements of hose distributors, and permitting a universally superior hose to be available to consumers at reduced costs as compared with known hose lines.

A hose line of the invention has a much greater strength than hose constructed in accord with the disclosure of U.S. Pat. No. 3,528,260, and has much greater resistance to high temperature deterioration than hose constructed in accord with such patent.

Usually, flexible hose capable of dependable operation at 300° F. under pressurized conditions in the range of 500 to 3,000 psi is formed of polymerized tetrafluoroethylene inner tubes encased within stainless steel braided reinforcement, and the cost of such hose is as great as ten times that of hose constructed in accord with the invention for meeting the same operating requisites.

BRIEF DESCRIPTION OF THE DRAWINGS

The aforementioned objects and advantages of the invention will be apparent from the following description and accompanying drawings wherein:

FIG. 1 is a schematic diagram illustrating a typical pressurized hydraulic fluid system utilizing the inventive concept, FIG. 2 is a detail, elevational, fragmentary view of flexible hose constructed in accord with the invention, FIG. 3 is a graph illustrating comparative results of hydraulic impulse test conducted on hose in accord with the invention and conventional hose, and, FIG. 4 is a comparative graph indicating test results with respect to 300° F. hot oil circulation and flexing as compared with hose constructed in accord with the invention and conventionally available hose.

DESCRIPTION OF THE PREFERRED EMBODIMENT

FIG. 1 illustrates a typical hydraulic fluid circuit utilizing the inventive concept. A reservoir is indicated at 10 serving as a vessel for the fluid not located within the other components of the system, and providing a supply for the motor driven pump 12 through the conduit 14. The output of the pump 12 is supplied to a pressure regulating valve 16 through the flexible hose line 18, and upon the pressurized system being unable to receive the output of the pump 12 the pump output is returned to the reservoir 10 through bypass conduit 20.

The valve 16 communicates with the four way valve 22 through flexible hose line 24, and the valve 22 controls the flow of pressurized fluid to the expansible chamber motor 26 which includes the piston 28 and the piston rod 30.

Expansible chamber motor 26 is connected to the valve 22 by flexible hose line 32 for communication with the motor chamber at the left of the piston 28, and the motor chamber at the right of the piston 28 communicates with valve 22 through hose line 34. Hose line 36 connects valve 22 to the reservoir 10 whereby the exhaust fluid may be returned to the reservoir for recycling through the system. It will therefore be appreciated that valve 16 permits a predetermined pressure to be imposed upon the valve 22 and motor 26, and the operation of the motor 26 is selectively controlled by the position of the valve 22, which may be manually controlled, or may be controlled by operating mechanism, not shown, correlated to the movement of piston rod 30.

In a typical system as shown in FIG. 1 the operating pressures within the motor 26 may be as much as 3,000 psi, and the motor 26 may be used to operate components of machine tools, heavy construction equipment, aircraft control surfaces, or used in the other many applications for pressurized fluid systems.

A flexible hose as utilized in the hydraulic fluid system of FIG. 1 is illustrated in FIG. 2 at 38. Such a hose includes an elastomer inner tube 40 having an internal diameter or ID which determines the hose capacity. The inner tube 40 is reinforced by a braided filament sheath 42 of polyester, for instance, which prevents significant radial expansion of the inner tube 40. The reinforcing braid 42 is covered by an intermediate tube 44 of elastomer material which is in turn reinforced by the braided filament sheath 46 which may be of wire. An outer tube 48 encompasses the sheath 46, and is enclosed within the braided reinforcing cover 50, which is formed of polyester filaments in a commercial embodiment of the invention. The sheaths 42, 46 and 50 may be formed of wire filaments, or may be nonmetallic, depending on the pressure requirements of the particular hose.

The end of the hose 38 is provided with a fitting 52 which may be of the reusable type, or may be permanently affixed to the end of the hose and permits the hose to be attached to the fittings of the hydraulic system.

In a pressurized hydraulic system as that described above the flexible hose line will be subjected to high pressures, often in the neighborhood of 3,000 psi, and the movement of the fluid and the resultant shearing forces occurring therein during pumping, valving and flow cause the temperature of the fluid to increase. In many instances, particularly where the hydraulic system is being used in proximity to an internal combustion engine, or other heat producing source, the temperature of the oil may approach 300° F., and such an elevated temperature rapidly accelerates the deterioration of pressurized hose constructed in accord with conventional practice.

The improved resistance to temperature, chemical deterioration, flexing failure and pressure resistance produced by flexible hose constructed in accord with the invention results from the use of cross-linked chlorinated polyethylene as a prime constituent. However, in order to achieve the desired physical characteristics, the chlorine content of the cross-linked chlorinated polyethylene, and the percentage of the cross-linked chlorinated polyethylene with respect to the complete hose composition is significant.

In the practice of the invention it has been discovered that particularly advantageous results for hydraulic pressure fluid system hose lines are achieved where the chlorine range of the cross-linked chlorinated polyethylene employed lies between 25% and 50% by weight. This range produces the desired balance with respect to chemical resistance of the hose material, and resistance to heat. While the maintaining of the chlorine content at a relatively low level increases the resistance to heat aging, the increase of the chlorine content produces better chemical resistance. Experimentation has indicated that a cross-linked chlorinated polyethylene material approximately 36% by weight chlorine produces an excellent compromise for chlorine content with respect to flexible hose employed with hydraulic fluid pressurized systems utilizing known hydraulic fluid compositions.

In order to produce the desired strength characteristics required to resist the internal pressures within the hose, and to also maintain the cost of manufacture at a minimum with respect to the characteristics desired, the percentage, by weight, of the cross-linked chlorinated polyethylene used in the rubber component of the hose material is between 30% and 70%. The percentage by weight of the cross-linked chlorinated polyethylene used in the hose material is varied within this range depending upon the strength of hose desired, and the cost range desired.

As described above, a typical hose constructed in accord with the invention usually includes several elastomer tubes formed of the cross-linked chlorinated polyethylene material. The inner tube 40 may be formed of a material having a higher percentage by weight of cross-linked chlorinated polyethylene than the intermediate tube 44. Likewise, the outer tube 48 may be of a slightly different composition than the inner tubes 42 and 44. By varying the composition of the tubes, the cost of the tubes, particularly of 44 and 48, may be reduced without seriously compromising the physical characteristics desired. However, hose constructed in accord with the invention usually utilizes inner and outer tubes of identical composition and proportions of cross-linked chlorinated polyethylene.

As is conventional in the manufacture of hydraulic hose, carbon black is a significant constituent, and in hose constructed in accord with the invention carbon black comprises in the range of 30 to 120 parts per 100 parts of cross-linked chlorinated polyethylene by weight. For hose which is to be used in the high pressure ranges a carbon black of the N-347 type is employed to obtain the desired stiffness and strength. Hose lines used at the lower pressure ranges use an N-774 carbon black in that the softer and easier processing compounds simplify hose fabrication.

The remaining composition of the hose consists of stabilizers, lubricating agents, processing and cross-linking agents of known chemical composition and use. For instance, conventional polyvinyl chloride polymer stabilizers such as tribasic lead sulphate, calcium oxide, lead oxide or magnesium oxide may be employed to resist thermal decomposition. This stabilizer preferably comprises 5 to 25 parts per 100 parts of cross-linked chlorinated polyethylene by weight of the composition.

An expoxidized vegetable oil ester is used having a range of 5 to 50 parts per 100 parts of chlorinated polyethylene to impart low temperature flexibility and also functions as a heat stabilizer and processing aid. Likewise, an epoxy resin of 3 to 10 parts is used for similar purposes, a polymerized trimthyl dihydrory quinoline at 0.1 to 0.5 parts is employed as an antioxidant and polyethylene at 1 to 5 parts is used to improve processing, particularly extruding, and functions as a lubricant.

A cross-linking agent such as a mixture of bis (t-butylperoxy) diisopropylbenzene (40%) Burgess KE Clay (60%) is used as a cross-linking agent at a ratio of 1 to 30 parts per 100 parts of cross-linked chlorinated polyethylene wherein upon thermal decomposition at cross-linking temperatures free radicals are formed which extract hydrogen atoms from the chlorinated polyethylene molecule. This allows cross-linking by carbon to carbon bonding, and various types of organic peroxides may be used for this cross-linking.

A mixture of 80% calcium oxide and 20% rubber process oil at 2 to 20 parts per 100 parts of cross-linked chlorinated polyethylene absorbs water formed within the cross-linked chlorinated polyethylene during the cross-linking action and thus prevents blistering.

A coagent, such as polybutadiene is used at 1 to 30 parts per 100 of cross-linked chlorinated polye thylene to improve the process ability and physical properties, such as chemical and oil compatibility of the hose composition. This coagent may be polymeric or monomeric. This coagent is capable of being cross-linked by the same method of cross-linking as the chlorinated polyethylene. Other coagents which may be used are ethylene propylene, ethylene vinyl acetate, acrylonitrile, polyethylene, butadiene, ethylenglycol dimethacrylate, triallyl isocyanurate or Dially Phthatate.

The hose material is formed by mixing the ingredients in a Banbury mixing machine at slow speed.

Initially, the cross-linked chlorinated polyethylene material is mixed with the polymerized trimethyl dihydrory quinoline, lead oxide and calcium oxide-rubber process oil. After one minute of mixing approximately half of the carbon black is added. After another minute of mixing the remainder of the carbon black is added and half of the polybutadiene and epoxidized soybean oil is added. After two minutes of mixing the remainder of the polybutadiene and epoxidized soybean oil is added and the mixture mixes for an additional minute and a half at which time the bis (t-butylperoxy) diisopropylbenzene-Burgess KE Clay is added, and mixing continues for another minute.

After mixing the mixture is removed from the mixing apparatus and is ready for fabrication. The forming of the hose takes place on conventional hosemaking equipment, such as an extruding press, wherein the inner tube 40 is first extruded and braided at 42, the intermediate tube 44 is applied as a calendar layer or viscous adhesive cement upon the braid 42 and is in turn reinforced by braided sheath 46. Outer tube 48 is applied as a calendar layer or viscous adhesive cement upon sheath 46 and is protected by braided cover 50. The hose is then placed in an autoclave and is cured at approximately 320° F.

Hose constructed in accord with the above description has been subjected to standard hydraulic impulse tests and circulation and flexing tests at 300° F. The results of these tests as compared with standard Society of Automotive Engineers' requirements and types of flexible hose are shown in FIGS. 3 and 4.

With reference to FIG. 3, various internal diameter sized hose has been compared under hydraulic impulse testing. Column A for each size represents SAE 100R5 performance required at 200° F. Column B represents the average performance of SAE 100R5 type hose at 300° F., and Column C represents the actual performance of hose constructed in accord with the invention at 300° F. Each hose was subjected to the same temperature and pressure conditions, and it will be noted that all of the SAE 100R5 type hose at 300° F. fail at less than 150,000 cycles. Hose constructed in accord with the invention withstood 1,000,000 impulse cycles and the test were terminated at that point without failure of the hose.

FIG. 4 indicates comparative testing of hose constructed in accord with the invention with conventional types of hydraulic hose at the 300° F. hot oil circulation and flexing test results. In this test procedure the fluid within the hose is at 300° F., the ambient temperature is 180° F., and the internal pressure within the hose is 60 psi. The hose is bent through 180°, and the ends thereof are flexed in parallel relationship. Column A represents SAEJ1402 type "E" Cres Wire hose, column B represents SAEJ1402 Type "D", Class I hose, column C represents SAEJ1402 Type "D", Class II hose, column D represents SAE1402, Type "D", Class I, High Temperature hose, column E represents SAEJ1402, Type "E" hose, column F represents SAEJ1402 Type "D", Class I, SAE100R5 hose, and column G represents hose constructed in accord with the invention.

The hose in each column, except column G, was flexed until failure, and the number of cycles is noted at the left of the graph, while the number of hours is represented at the right. At each hose size column G. indicates the point at which the testing of hose in accord with the invention was terminated without hose failure, and it will be appreciated that in each instance superior hose life was achieved in this test.

One of the big advantages of hydraulic fluid system hose constructed in accord with the invention lies in the ability of the hose to be used with both petroleum and non-petroleum bases hydraulic fluids. Previously, at least two types of hose were employed for these two classifications of fluids. For instance, petroleum base hydraulic fluids include, in addition to conventional petroleum bases, a water and petroleum oil emulsion, phosphate ester and petroleum oil blends, and chlorinated paraffin and petroleum oil blends. Non-petroleum hydraulic fluids include water glycol solutions, phosphate ester bases, ester blends, diester, neopentyl ester, poly-ester and silicone oils. Hose constructed in accord with the invention is compatible with all of the above mentioned fluids. In addition, the hose of the invention may be used with phosphate ester, chlorinated hydrocarbon and petroleum oil blends, a fluid which is normally not usable with conventional hydraulic fluid system hose. Tests conducted with hose of the invention have proven to be universally resistant to all types of hydraulic fluids, and have proven superior under high temperature operation to conventional elastomer hose. Extraordinary resistance to corrosion and flexing failures has been noted. Additionally, the hose is compatible for use with conventional permanent or reusable end fittings and the cost of the hose is less than presently available hose with commonly used fire resistant synthetic based hydraulic fluids.

It is to be understood that hose manufactured using the composition of the inventive concept may be constructed in accord with any conventional practice, and is not limited to the particular construction illustrated in FIG. 2. For instance, the hose may consist of only an inner tube, a reinforcing braid and an outer tube, or in very low pressure applications, could consist of only an inner tube. The hose may include calendar layers to form intermediate and outer tubes, and the reinforcement may include spirally wound wire layers, rather than braided sheaths.

I claim:

1. In a pressurized hydraulic fluid system comprising a hydraulic fluid pump, pressurized hydraulic fluid utilizing means, a control valve and a hydraulic fluid supply connected together by conduit members, the improvement comprising at least one of said conduit members constituting a hose including an inner tube having as a prime constituent comprising 30% to 70% by weight of said tube cross-linked chlorinated polyethylene having approximately 36% chlorine by weight, adjacent chlorinated polyethylene molecules being cross-linked by carbon to carbon bonds, said hose tube including a coagent used at 1 to 30 parts per 100 of cross-linked chlorinated polyethylene, said coagent being taken from the group of polybutadiene, ethylene propylene, ethylene vinyl acetate, acrylonitrile, polyethylene, butadiene, ethylenglycol dimethacrylate, triallyl isocyanurate or Dially Phthatate, and said hose tube including 30 to 120 parts carbon black, by weight, per hundred parts of cross-linked chlorinated polyethylene.

* * * * *